United States Patent [19]

Heard

[11] Patent Number: 4,524,405
[45] Date of Patent: Jun. 18, 1985

[54] FAN-SHAPED INDIRECT LIGHTING REFLECTOR

[76] Inventor: Charles M. Heard, 107 Aribe Dr., San Antonio, Tex. 78216

[21] Appl. No.: 530,369

[22] Filed: Sep. 8, 1983

[51] Int. Cl.$^3$ .............................................. G03B 15/02
[52] U.S. Cl. ...................................... 362/18; 362/278; 362/297; 362/320; 362/346; 362/347; 362/449; 362/450
[58] Field of Search ................. 362/18, 278, 297, 320, 362/346, 347, 449, 450

[56] References Cited

U.S. PATENT DOCUMENTS 3,851,164 11/1974 Intrator ................................ 362/320
4,075,472 2/1978 Higuchi ............................... 362/320

Primary Examiner—Stephen J. Lechert, Jr.

[57] ABSTRACT

A fan-shape foldable reflector apparatus for use with known flashing or constant beam light-source types, such are generally used by photographers for producing indirect-lighting effects by directing the emitting beam from such a light-source type to impact a reflective surface which faces an area to be so illuminated. The said fan-shape reflector produces similar indirect-lighting effects by causing the beam emitted from such a light-source type to impact this forward-curved reflective means at an upward oblique angle, thereby the beam is refracted, broadened and richochetted as diffused rays onto a subject area to which said reflector is principally faced. This improved reflector additionally comprises all necessary means for attaching and positioning various type light-sources.

20 Claims, 30 Drawing Figures

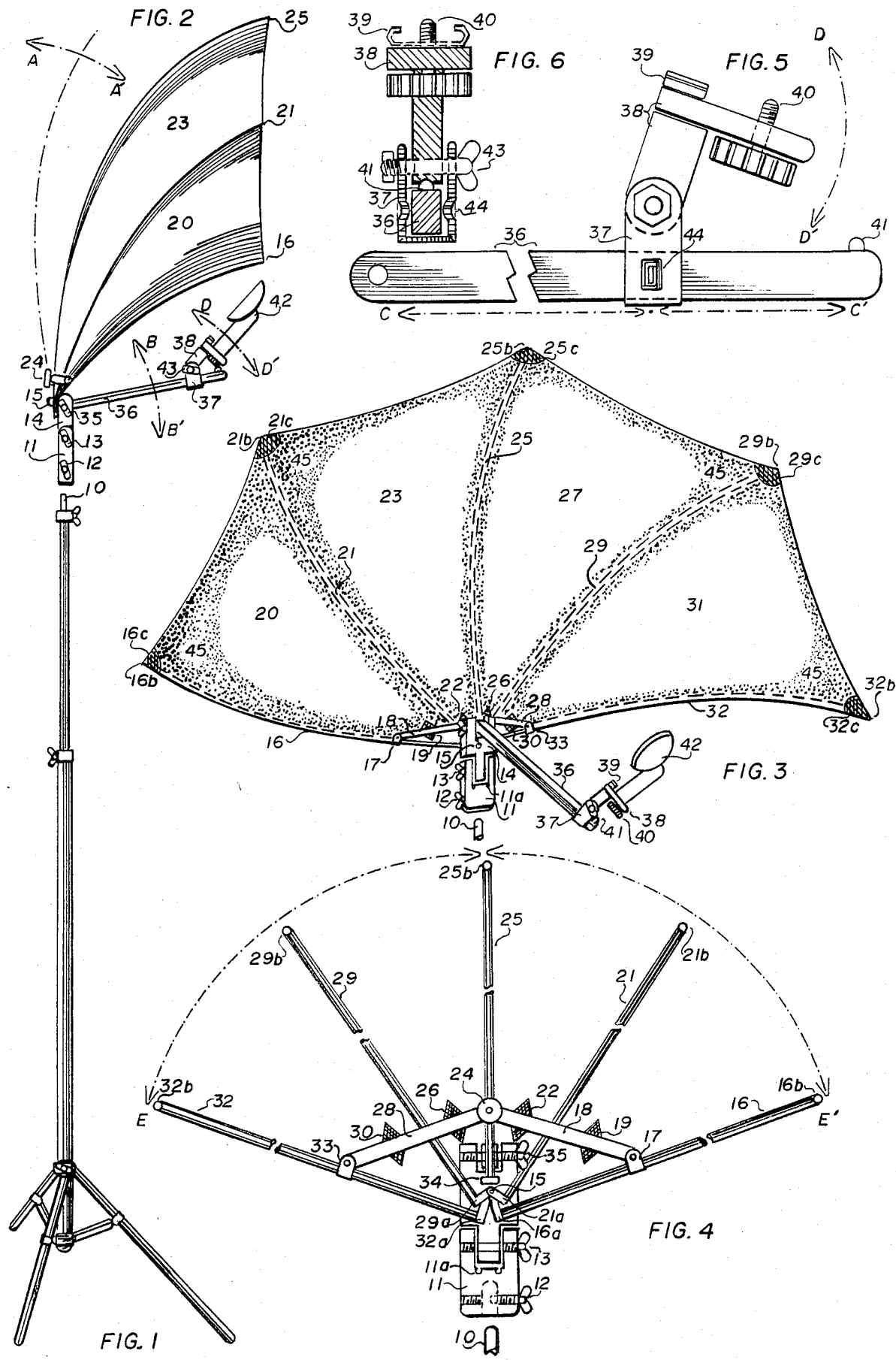

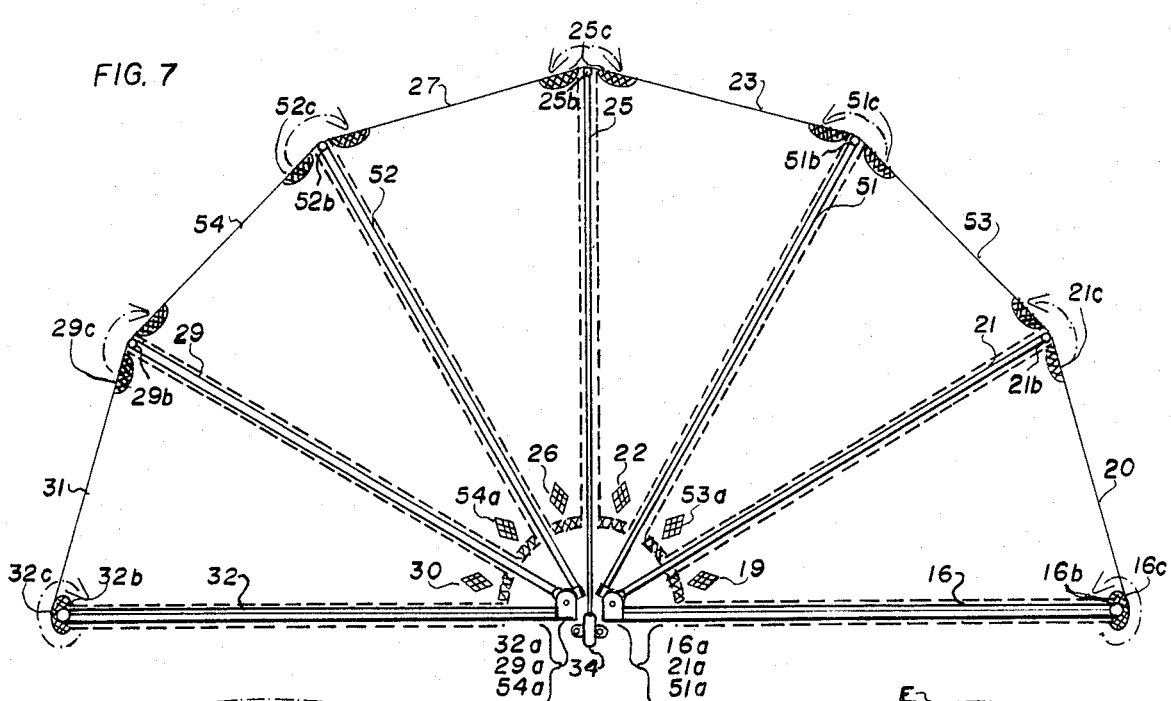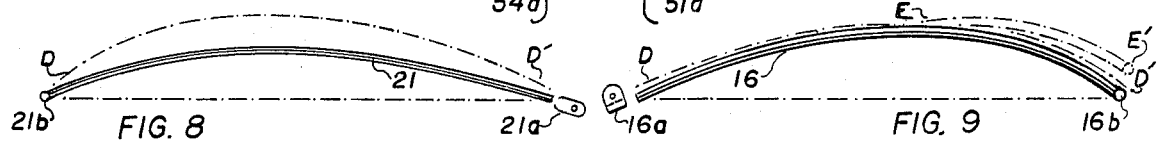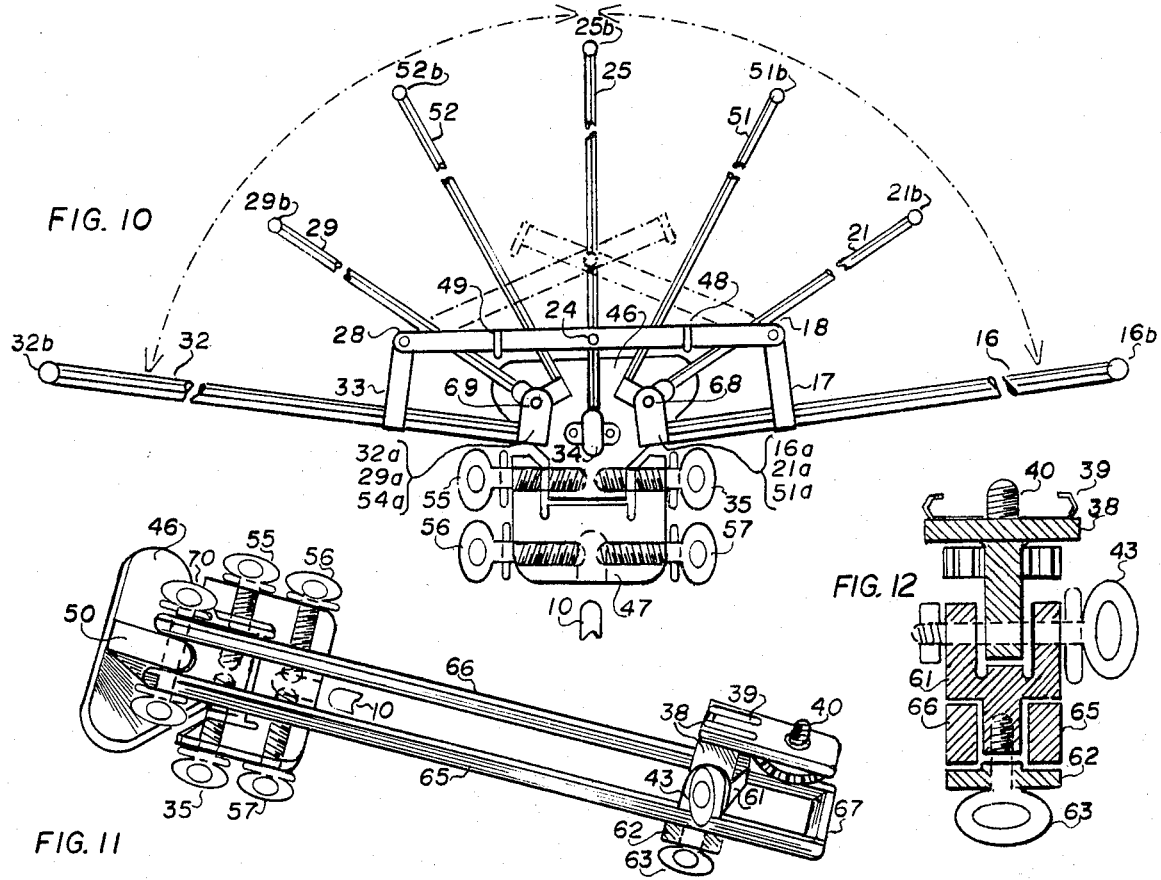

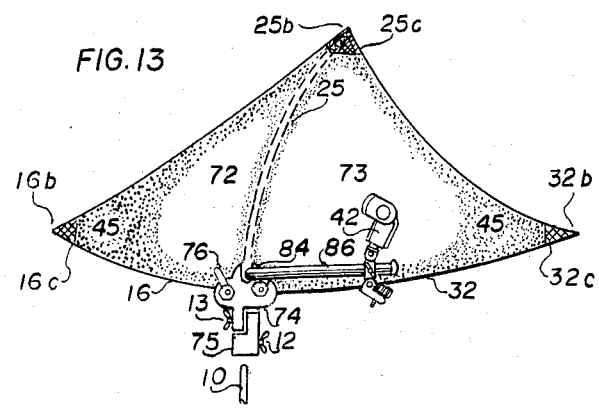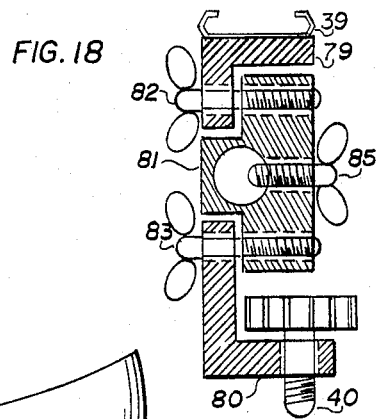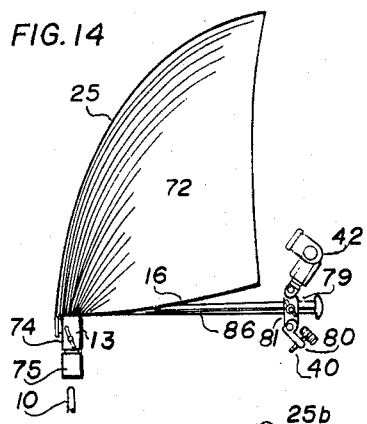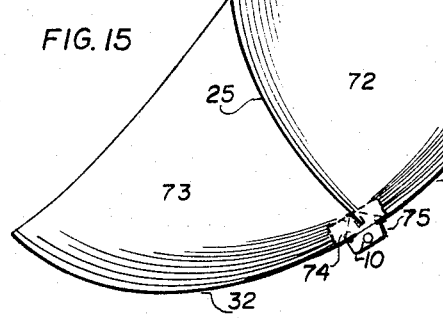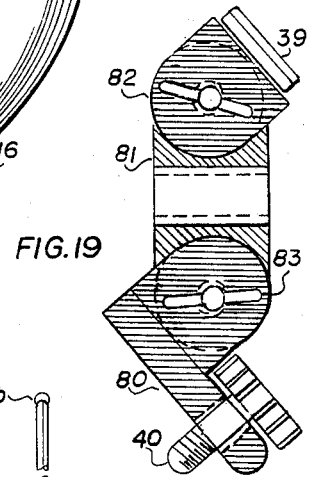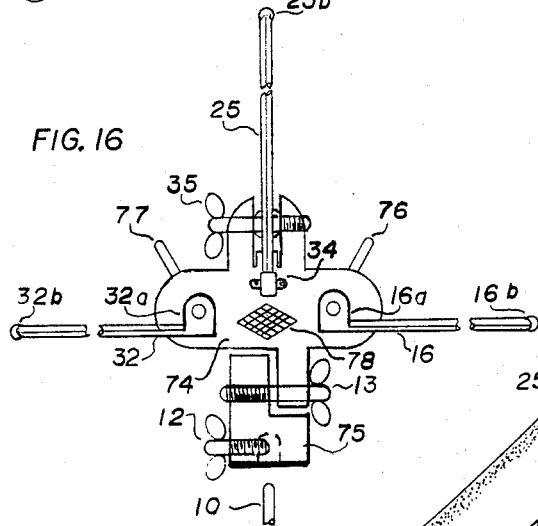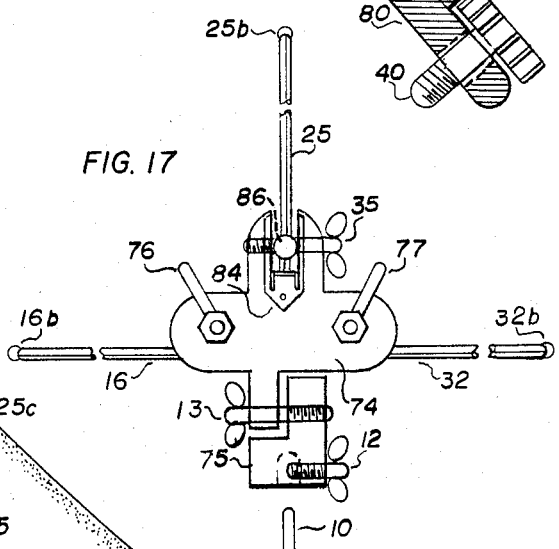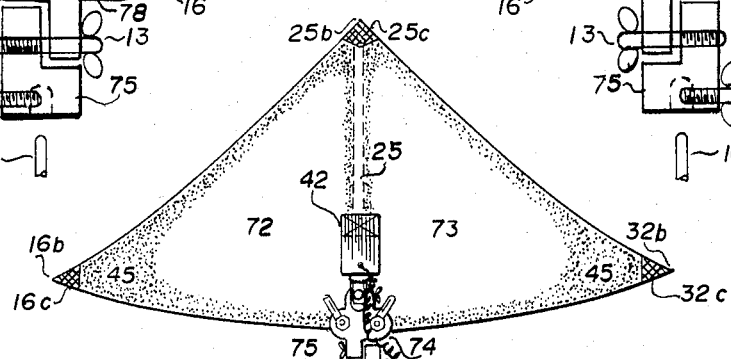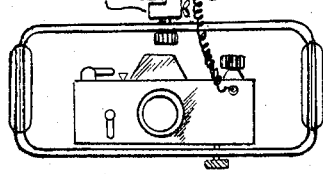

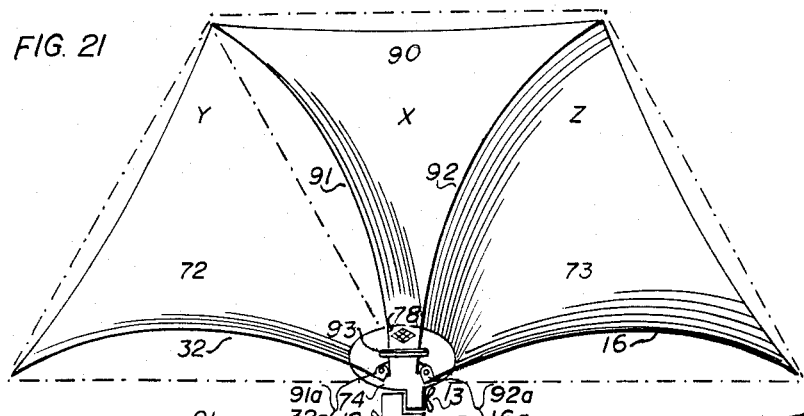
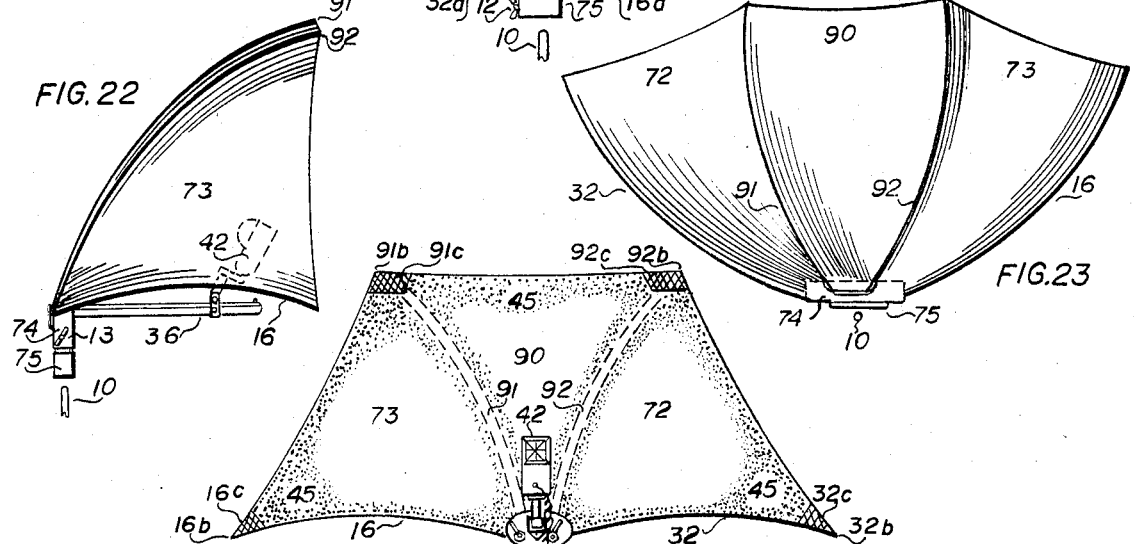
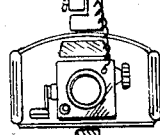
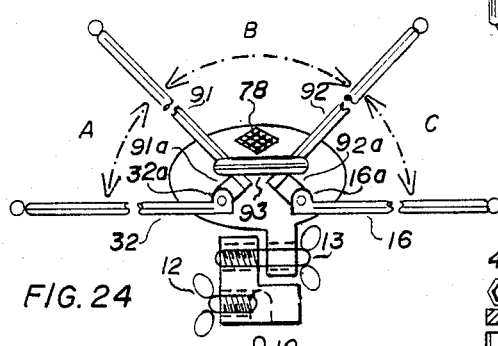
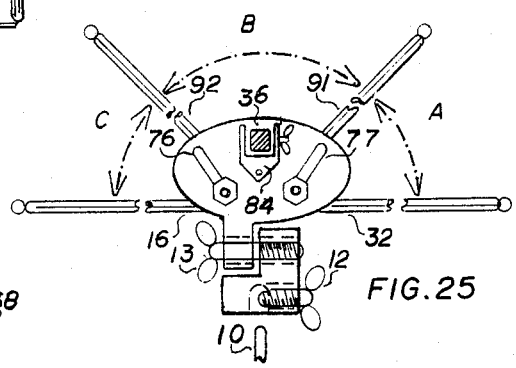
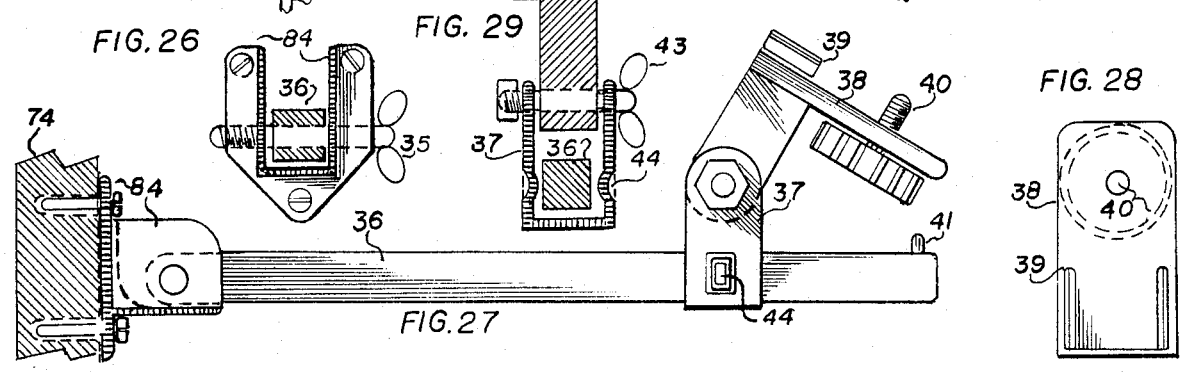

FAN-SHAPED INDIRECT LIGHTING REFLECTOR

BACKGROUND OF THE INVENTION

1. Field of the Invention

This invention relates generally to folding type fabric reflection devices, as used in photography and graphic arts to produce shadow and highlight reducing indirect lighting effects upon a subject or area, whereby an external light source such as an electronic flash or incandescent lamphead is attached to the reflector and its beam directed onto a reflective surface thereof to be diffused as scattered rays reaching the subject area as indirect "bounce" light.

This invention presents a new and novel type collapsible reflector assembly having a methodology for producing greater illumination efficiency and directional controllability in achieving similar indirect lighting effects by "ricochet" lumens.

2. Cross Reference Related to Application

Patent and Trade Mark Office's Disclosure Document Program, Registration No. 104505, Mail Room date Nov. 30, 1981.

[Disclosure accompanied by photographs and test results of prototype.]

3. Description of the Prior Art

Heretofore there were only three basic types or shapes of folding reflectors used by photographers for producing indirect lighting effects with external light sources or ambient sunlight: The first type being merely a framework having a reflective fabric material streached upon it to disperse the beam from a separated light source or rays from the sun; however, great care is required with placement of the lamphead to avoid a mirror-image of the beam being reflected into the scene by the rays being reflected but not diffused. Therefore, the flat type reflector is generally used only secondarily to redirect primary illumination back onto the scene. Mounting the flat reflector and the separate light source additionally make this type virtually obsolete.

The second type folding reflector is the more commonly used round shape umbrella for producing indirect or "bounce" light from the beam of an external source attached to the umbrella's center-pole of these versions of the traditional rain/sun style umbrella, which all require a separate clamping device to mount the umbrella onto a suitable light-stand, and which likewise clamps the center-pole in a cantilevered manner. The external light source's weight is then likewise cantilevered, since it is attached to the opposite end of the center-pole by another clamping device or a double-ball-and-socket arrangement, either of which may be a separate part requiring somewhat difficult attachment and alignment of the light source, same usually being an electronic flash unit triggered to fire by a photo-sensitive slave reacting to an on-camera flash, which likewise must be attached to the umbrella or light source. Once assembled the umbrella still must be angled and positioned, and often re-balanced, by adjusting these devices, as abovesaid. Therefore, the opening, mounting and stabilizing such umbrellas and the attached light source becomes quite difficult under many studio and location conditions, as does the necessary disassembly before such units can be furled for transport or storage, same being especially difficult in maintaining their many loose parts which are easily mislaid or lost since no provision is made for them in the carrying cases usually provided with such umbrellas. In addition to these structures and their elements being awkward to set-up, their physical size and top-heavy balance makes them precarious to work with in confined areas. Other physical and inherent problems with such umbrellas affect their reflecting efficiency adversly, due to the source beam being aimed toward the interior of the opened hexagonal or octagonal reflective cover in an off-center manner by the source being attached atop the center-pole. Further, since such covers are generally woven of simulated metallic thread, some of the beam's rays pass through the weave while others are overly deflected off of exposed ribs, hinged-spreader for the ribs, center-pole and the lamphead itself, thus many lumens are dispersed ineffectually. Furthermore, due to their usual 36" to 52" reflector size of 9 to 11 square-feet and their lack of control of the reflected illumination produced as virtually random rays, such structures require high input candlepower to be effective on a large subject or scene area.

The third and last type of folding fabric covered reflector for producing indirect lighting is merely a modification or variation of the conventional umbrella, excepting that it has only four triangular panels forming a square reflective cover suppoted by four ribs, but having its ribs, hinged rib-spreader, center-pole and the obstructing lamphead attaching devices cluttering the inner-surface of the reflector to thereby reduce its reflective efficiency. Like the round type umbrellas, the external light source is attached to the center-pole and its beam directed to impact the center of the inverted pyramidal shape reflective surface; however, most of these square versions have an improved system for mounting the light source so that the actual lamphead is centered along the center-pole. However, in order to accomplish this improvement of off-centering the remaining mass of the usual self-contained flash or the lamphead and its support for the larger strobe units having separate power-packs, two additional loose parts are required to be attached upon the center-pole. The first member is L-shaped and secured to the center-pole by a set-screw, then the second part is fitted into a hole in the lower section of the L-shape, which allows this rod-like element to be moved up or down and secured by another set-screw or thumb-screw, after separately attaching the lamphead atop the sliding rod, or else the parts may be assembled before affixing the top of the L-shape member onto the center-pole. Thereafter additional adjustments are required to balance the cantilevered weight at each end of the center-pole, plus re-adjusting the separate clamping unit holding the assembly upon the necessary light-stand, in order to angle the device. But, as with the round umbrellas, most of the loosely woven metallic thread cover allows some of the rays to pass through the reflector, rather than being directly bounced backward upon a scene. Further, the rays which are thereby reflected are widely scattered, due to the low angles of the four reflecting panels, thus the peripheral areas of the reflected illumination are considerably weakened in lumen intensity; therefore, the square umbrealla gives its best results in lighting very wide scene areas. Furthermore, the wide-spreading pattern of indirect lighting thus produced lacks the "wrap-around effects" developed by the round-umbrellas, which is a desirable feature in subject lighting.

Despite their many disadvantages, such umbrellas are the current state-of-the-art for fabric covered reflectors.

SUMMARY OF THE INVENTION

The objective parameters of this invention are: That it should be (1) easy to collapse for transport or storage, (2) simple to set up and spread for use, (3) be completely self-contained with all moving parts remaining attached, (4) be conformed for use in confined areas, (5) have lessened wind resistance for outdoor use, (6) allow for instant reversing or substituting of its reflective cover, (7) provide greater directional control of reflected light output, and (8) to produce higher efficiency of reflected lumens than is possible with umbrella-type folding reflectors now existing.

Accordingly this invention presents a novel fan-shape concept for a fabric covered collapsible reflector, which is semi-automatically spread and tauted by a one-hand operation, as is, likewise done in attaching an external light source upon affixed but articulated members of this self-contained assembly. The configuration of the thus opened reflector is analogous to the forward-dished, radial spreading of a peacock's tail, rather than the shape and method of spreading traditional hand-fans. When collapsed, the assembly folds into a scimitar shape for encasement in a sheath-like carrying case which has space for the protected external light source or lamphead to remain attached to the reflector, thereby enabling the assembly to be instantly ready for use by installing it upon a photographic-type lightstand, spreading the cover and pivotally positioning the lamphead so that its beam will strike the dished-in reflective cover at any desired angle to produce a "ricochet effect" of the rays.

It is the characteristic fan-shape and the methodology of directing the light beam to strike the reflecting surface's semi-parabolic curves at an oblique angle, rather than the rays being merely bounced from a similar surface, which increases the efficiency of the indirect lighting produced by the invention. The beam emitting from the lamphead is aimed upward from a position of approximately 45° below and forward of the fan's inner-surface, which coincides with the widening of the beam's pattern to thereby ricochet all of the illumination toward the subject area with the ray's travel distance being this minimized. The assembly's efficiency is further increased by the fan-shaped reflector having a reflective surface which is completely free of obstructions, sincg all stays and ribs are covered by the simulated metallic fabric and there are no center-pole or spreader elements to deflect the ricochet rays, likewise even the light source's lamphead is removed from the illumination path by its being located below the actual reflective surface.

The enablements for articulation of this reflector add to its increased efficiency and usefulness, since the entire assembly can be lifted to direct its output lumens onto the subject area from varied angles and the actual intensity and spread of the reflected indirect light can be controled by altering the angle of the source beam's position in relation to the reflecting surface. This feature of directional and intensity control makes the invention all the more unique when compared to existing umbrella types of folding reflectors, as does the fan-shaped invention having the unusual facility for easy reversal or exchange of its cover in the field or studio without tools or undue effort.

These together with other objects and advantages will become subsequently apparant, as disclosed in the details of construction and operation hereinafter as further described and claimed, with reference being made to the accompanying drawings forming a part thereof, and wherein like numerals refer to like parts throughout.

DESCRIPTION OF THE DRAWINGS

FIG. 1 is an illustration of a conventional telescoping lighth-stand.

FIG. 2 is a right side view of the prefered embodiment of this invention.

FIG. 3 represents a perspective of the spread reflective cover and light source.

FIG. 4 is a detailed rear view of the invention's system for its mounting upon a light-stand and its means for spreading the flexible cover.

FIG. 5 is a side view of light source support and adjustable positioning system.

FIG. 6 is a cross-sectional front view of the light source positioning system.

FIG. 7 is a flat layout for a six-panel modification showing stays and ribs in respective positions before encasement within overlapped panels.

FIG. 8 is typical of pre-bent ribs used in all illustrated versions of invention.

FIG. 9 is typical of pre-bent stays used in all illustrated versions of invention.

FIG. 10 detailed rear view of six-panel modification's support and spreading.

FIG. 11 frontal perspective of modified light support for heavier light units.

FIG. 12 frontal cross-section of modified light source positioning system.

FIG. 13 frontal perspective of two-panel modification, as in use with light unit.

FIG. 14 right side view of this modification, showing light source positioned.

FIG. 15 top rear perspective of same modification, indicating triangular shape.

FIG. 16 detailed rear view of mounting support and spreading system, as modified for this two-panel version's reflective cover.

FIG. 17 detailed front view of same support and cover spreading system.

FIG. 18 cross-sectional of modified light source positioning and mounting for lighting unit upon a tubular supporting arm.

FIG. 19 side view of same light source mounting and positioning modification.

FIG. 20 illustration of two-panel version reduced for "on camera" usage.

FIG. 21 phantom rear view of three-panel modification using the triangular panels, indicated as flat outlines and as contoured when spread.

FIG. 22 right side view of three-panel modification, indicated light source.

FIG. 23 rear top perspective of same modification three-panel version.

FIG. 24 detailed rear of support and cover spreading system for three-panel version using similar stays, as in other versions, but without central rib, as used in all other embodiments illustrated.

FIG. 25 detail of front of modified support and spreading of three-panel cover.

FIG. 26 front detail of restricting and stabilizing apparatus for the light source support arm, as required when any illustrated version is reduced in size for "on camera" usage.

FIG. 27 side view of restricting apparatus showing light source support arm and the mounting and positioning system's adjustments.

FIG. 28 top view of light source mounting platform, showing means for attaching lighting units having "hot shoe" or stud-mount requirements.

FIG. 29 cross-sectional detail of light source mounting and positioning support, which is reduced in size when used with any "on camera" modification of the invention.

FIG. 30 frontal illustration of small three-panel version mounted upon a suitable camera-bracket for handheld camera lighting use. NOTE: Conventional items of photographic equipment used in drawings of this invention are illustrated only as references to their use with the various versions and modifications of the invention's embodiments.

Referring to FIG. 1 of the drawings, and all figures thereafter, the reference numberal 10 indicates the tip-end of a conventional light-stand having an approximate tip diameter of 3/8" which will engage into a usual ½" diameter hole in the base of the invention's lower support 11, and is secured thereto by tightening thumb-screw 12, as in FIG. 2, against the tip. FIG. 2 indicates by dash-dot lines the various articulations of the fan-shaped apparatus when in use for indirect-lighting effects by directing a light source 42 to impact the inner reflecting surface 45 of all version modifications of the apparatus. FIG. 3 indicates the positioning of 42 to impact and reflect from panels comprising 45. The entire upper-support 14 is axialy supported by thumb-bolt 13 for adjusting the angel of 45 vertically, then stabilized by tightening 13. Notching 11 and 14 yoke sections at 11a and 14a allows the uprights of each supporting yoke to compress inwardly to thereby frictionally stabilize articulation of 14, as in FIGS. 3 and 4. The 12" to 18" length of light support arm 36 is thus positioned between the uprights of 14 and is axially mobile, as in FIG. 2, upon thumb-bolt 35 and with which the arm is stabilized. Sliding traveler 37 moves along 36, as in FIG. 5, to any desired position thereon while supporting tilting light source supporting platform 38, which has a standard double-flange amount 39 for attaching the "foot" of self-contained electronic flash units 42 designed to fire from a "hot shoe" atop the most used types of modern cameras. Additionally, the tilting platform 38 has a free-turning stud 40 protruding about 3/8" above the top surface of 40 having a standard 12/20 male threading to mate with the lamphead 42 of the types of strobe units having detached power-packs. The knureled knob of 40 allows easy tightening of 42 against platform 38 upper surface, thereafter the light source of whichever type may be directed onto the reflective surface 45 by tilting 38 and/or angling arm 36. Both traveler 37 and platform 38 are stabilized by tightening thumb-bolt 43, which compresses indentations 44 against 36, as in FIG. 6. As shown in detail of FIG. 5, there is a stop 41 protrusion atop 36 to elimnate any possibility of travelers 37 slipping off the free-end of 36. The material for construction of all articulated support structures may be cast or milled for plastic or metal having some degree of malleable qualities, with all thumb-screws and bolts being ¼" steel with 12/20 threads to mate with female threading in structural parts 11 and 14 for stabilizing 14 and 36.

FIG. 3 indicates details of the fan-shape reflector's cover configuration which is of fabric construction having a reflective inner-surface of silver/gold simulated metallic thread in its weave, 45, comprised of four wedge-shaped panels 20, 23, 27 and 31 with each being approximately 26-inches from top to bottom by 16-inches across their tops and 4-inches across their bottom ends. The adjacent edges of each panel's tapered longitudinal angles, as indicated by dash-lines, are overlapped by approximately 1-inch, then joined to the respective adjacent panels to form tube-like passages within the cover's area. In the prefered embodiment, the four panels comprising 45 have the fan-shape with a flat spread of 60-inches tip-to-tip in an arc of 120° for an area of about 5½ square feet, which includes the radial passages since they are parts of 45 itself. As in FIGS. 3 and 4, the cover 45 is supported and contured by the insertion of stays 16 and 32, then sequentially the central rib 25 and ribs 21 and 29, into their respective passages. Central rib or stay 25 is fixed to upper-support section 14 so that 25 is vertical to the rear of 14, wheras all other stays and ribs are laterally mobile to spread to collapse 45, as detailed in FIGS. 4 and 10. The stays 16 and 32 are rod-like metal or plastic of 3/16" or ¼" diameter with a length of 30-inches, having semi-rigid properties but malleable to allow pre-bending and retaining of a bow-shape, as in FIG. 9, which also has a compound curve bending to the respective left or right outward as the forward bow continues to the blunted tip B, with dash-dot line D'-E indicating the deflection from line C of the stay's pre-bending. The more flexible ribs are of equal length by ⅛" to 3/32" diameter and pre-bent to less bow-shaping, as in FIG. 8, and do not require compound curves. When cover 45 is spread and taut, all ribs will deflect to a greater degree of bowing, as in line D, to 6-inches or more in a forward arcing from rear of upper-support 14. All stays and ribs have blunted tips, as 16B, 32B, etc., which will contact the closed and reinforced top of each passage, as 16C, 32C, etc., as the cover 45 is slide downward along the stays and ribs within its passages until B's and C's are in contact. Each stay and rib has an affixed flag-like flange at its opposite end, as in FIGS. 4 and 10, with the flanges being of graduated lengths in pairs and having a common size hole, through which a pivotal retainer will secure them in a radial array onto the backside of 14 by retainer 15 of FIG. 4, which allows left/right mobility; however, the vertically fixed center stay or rib 25, being anchored by a saddle-shaped flange to the rear of 14 precludes the stays and ribs from movement expecting their restricted arcs to respective left or right, thus cover 45 is installed when all stays and ribs are vertical.

The installed cover 45 is secured and retained upon the stays and ribs by mating tab sections of Velcro-type material or mechanical snaps, one half of which is affixed to each surface of the four panels alongside the reinforced opening of each passage's lower end at points 30, 26, 22, 19, as in FIG. 4, while opposite halves of the Velcro or mechanical snap are affixed to the respective left and right dual spreader levers 18 and 28 in such manner that the Velcro or snaps will mate to retain cover 45 upon the array, or allow it to be removed for reversal or substitution when the Velcro or snaps are parted. Additionally, the mated tabs or snaps exert downward pulling on each cover panel as manual pressure is applied to pivotal center 24 of levers 18 and 28, thereby tauting cover 45 vertically and automatically as the dual-levers reach horizontal alignment and are thereafter frictionally locked by tightening knob on 24, since the opposite ends of each lever is pivotally attached to flanges 17 or 33 which encircle stays 16 and 32, the levers exert a mutual outward thrust upon the stays. As the cover is thus spread, the encased ribs move passively to the limit of their panel width to taut the cover 45 horizontally to the left and right of the central stay or rib, as in FIGS. 4 and 10, which causes all ribs to increase their curved deflection, D–D' FIGS. 8 and 9, to create the reflector's characteristic dished-in configuration while adding tautness to 45 by the rib's spring-action. Thereafter light source 42 is attached to mounting 39 or 40 and the angle of its beam output to impact reflective inner-surface of 45 is then readjusted and stabilized upon arm 36 and platform support 39 respectively, as in FIG. 5 lines C–C' and D–D'.

FIG. 7 is a layout of a six-panel modification having additional panels 53 and 54 to the described panels 20, 23, 27 and 31 with added support ribs 51 and 52. Arrowed lines A show the overlapping direction of panels having one fabric surface under and the other over the five ribs, as indicated by dash-lines to form encasing passages for the radiating rib array. The outermost edges of 45 are wrapped around their respective stay to form those passages. Reinforcement at corners C of each panel is likewise overlapped, and each panel has the half-section of Velcro or mechanical snap on each side of panels, as with the prefered embodiment. Attaching flanges for all stays and ribs are likewise the same in graduated lengths to allow free movement on their pivotal attachment to upper-support; however, this support 46, as in FIG. 10 is now widened to accomodate two pivotal retainers 68 and 69 in addition to central 25 stay or rib's affixing flange 34. Lower-support structure 47 is likewise broadened to provide overall mounting support for the entire apparatus, with dual thumb-bolts 35 and 55 to provide greater stabilizing friction upon downward extension of 46, and dual thumb-bolts 56 and 57 are provided to secure 46 to lightstand tip 10, since this modification has increased area of 45 to approx. eight square feet and added weight overall. When all six panels are overlapped and joined, cover 46 will have a 160° spread, or 180° if panels 20 and 31 are enlarged to compensate for the multiple overlaps of inside panels 54, 27, 23 and 53. As with the preferred embodiment of FIGS. 2 and 3, the six-panel version's actual area and spread of 45 is determined by the dimensions of its panels.

For the larger six-panel modification, the dual spreader levers 18 and 28 are changed to have two frictional locks 48 and 49 affixed to extensions outward from their central pivot 24, so that the levers 18 and 28 are riveted at 24 and the friction knob of 24 is no longer required by the sissor-like action of the levers, since the added 48 and 49 frictional stops will lock the levers when they are depressed to horizontal in fully spreading and tauting 45.

The light source support apparatus for the larger area modifications, as in FIGS. 11 and 12 is for use with heavier strob units or lampheads. There being a protrusion 50 affixed to the front of upper-support 46, so that twin rails 65 and 66 are axially retained and stabilized by thumb-bolt 70 in a parallel spacing, which is maintained by combination spacer and stop 67 at their free-end. Traveler 61 is modified to slide atop and between the two rails, there to be stabilized at any location thereupon by a loose block 62 which exerts brake action on the traveler as thumb-bolt 63 is tightened against the block to frictionally secure it to the two rails; however, tilting platform 38 remains the same size and has light unit attaching means 39 and 40. Traveler 61 allows tilting and securing of platform 38 when positioning the light source after attachment of 42 to either attaching means 39 or 40, with the unused means being used to attach a photocell or audio triggered remote firing "slave" to actually fire the light source, if 42 is a strobe unit.

A second modification is shown in FIGS. 13, 14, 15, which is a simplified two-panel version of 45 and the prefered embodiment. Only stays 16 and 32 plus the fixed central stay or rib 25 are used to support and shape cover 45, which now is comprised of two triangular panels 72 and 73 which may be equilateral or have curved diagonal sides and base. When 72 and 73 are joined to form the overlapped passage for 25, as indicated by dash-lines in FIG. 13 and the base edges of 72 and 73 are turned over and joined to encase stays 16 and 32, cover 45 will appear as an upside fan-shape; although this version may have an area and spread equal to the other versions, since its two panels are intended to be larger and to provide a different pattern of richocheted and reflected light, which will be broader overall with a higher central intensity.

This two-panel verison also has a simplified support system which does not have yokes, per FIGS. 4 and 10, but uses a single upright from the lower-support 75 to engage frictionally a single downward extension of upper-support 74; however, they are stabilized and axially joined by thumb-bolt 13, thus allowing the entire assembly of 45 to be atriculated vertically. The upper-support 74 is shaped to maintain the fixed central stay or rib and the stays, which are attached to the rear of 74 and with each stay 16 and 32 having its separate pivotal anchor as carriage-bolts 76 and 77 protruding through to the front surface of 74. Twin 12/20 threaded nuts have attached handles to aid in finger-tightening them to secure the bolts against the flanges of 16 and 32 and the front of 74, as each stay is separately moved and laterally stabilized to manually spread and taut cover 45. As with other versions, the lower-support section 75 contains the mounting hole and thumb-screw 12 at its base for attachment upon the tip 10 of a lightstand or hanging fixture for studio lighting. FIG. 17 shows the front of 75 with a single patch of Velcro, or half of a mechanical snap, affixed between nuts for 76 and 77 which will mate with a similar patch or half-snap affixed to inner apex of cover 45 for its retention or removal for changing the cover's inner-surface to white or other color, or its substitution. As with all versions illustrated, vertical tauting of 45 is accomplished by the pull of the retaining Velcro or mated snap on the cover against the blunted tips B, to thereby increase its bowing and thus its spring tension on the cover itself. The front of 75 also supports a separate affixed element 84 which is a combined support and restricting means for a modified light support arm, which is tubular and upon which slides an apparatus intended to revolve so that its main support 81 of FIGS. 18 and 19 allows either 79 or 80 to be uppermost for attaching a light source 42 and/or the slave-trigger unit upon whichever type mounting attachment is needed. Tilting platforms 79 and 80 respectively have the shoe-mount flange 39 and the threaded stud 40, with each being frictionally stabilized after their positioning by thumb-bolts 82 or 83, and with the entire light support assembly being stabilized by tightening thumb-bolt 35 in the "U" shaped 84, as detailed in FIGS. 26 and 27, and thumb screw 85 on traveler 81.

FIG. 20 shows how a reduced size version of the two-panel modification can be used as an "on camera"

reflector mounted upon a suitable conventional camera bracket, as with all other versions light source 42 faces the inner-surface of 45 to diffuse and reflect the output beam as indirect lighting, which is most effective in shooting close-up subjects or objects. The reduced version retains its directional tilting of 45 and positioning of 42; however, the light arm's vertical movement is restricted by 84 to avoid any possiblity of either the arm or the traveler encroaching into the angle of the lens' view, thus the arm is restricted to 90° maximum movement. The flash unit is fired by direct coupling to the camera's sync contacts through a standard PC cord, preferably of the spring-coil type. Due to the placement of the reduced size reflector well above the lens axis, "pink eye" effects are eliminated.

Dimensions of the reduced two-panel modification are 24-inches across by 12-inches high for the fully flexed and tauted cover 45, with the support structure being a minimum of 3-inches and a maximum of 6-inches high.

FIGS. 21, 22 and 23 establish a third practical modification of the cover 45 and its means for support and spreading three equilateral panels, as shown by dash-dot lines of FIG. 21, in which the central triangle is inverted. As in all versions of 45, the edges of panels next to the support and shaping stays and ribs are overlapped and joined to form encasing passages. The usual central stay or rib is eliminated in this modification by ribs 91 and 92 which serve to keep the cover 45 erectly supported and forward curved. Although each has lateral mobility by their retaining flanges being pivotal upon a bolt retainer shared with the respective stays' 16 and 32 flag-flanges, the side movement of 91 and 92 is limited by a flattened U-shape bar affixed onto the back surface of the upper-support 74 in such manner that the shaft of 91 and 92 are between the legs of the bar 93, thus the lateral travel of 91 and 92 is limited to about 4-inches. As cover 45 is manually spread by individually moving stays 16 and 32 and frictionally stabilizing them by tightening wing-nuts, or nuts having short handles as in FIGS. 17 and 25, numbered 76 and 77, against the respective flangs and the front surface of 74, the ribs 91 and 92 are pulled both sideways and forward passivly by the cover 45, thus they flex into compound curves, as in FIGS. 21 and 23.

FIG. 21 also shows how the flat triangles YXZ are changed into the contours of panels 72, 73 and 90 by the forward curves of stays 16 and 32 upon horizontal spreading and tauting, and the pulling of the fabric by ribs 91 and 92 to change the shape of center panel 90. FIGS. 24 and 25 show details of the cover's support system, which are similar to those of FIGS. 16 and 17 excepting the addition of limiting bar 93 and a longer strip of Velco, or halves of snaps, to mate with matching retainers on the panel's inside tips, as in other versions. The retaining Velcro strip or multiple snap halves 78 is located on the rear surface of upper-support 74, which is modified to accomodate bar 93, with 78 located immediately above 93 so that spreading of stays 16 and 32 causes ribs 91 and 92 to press their blunted tips against the reinforced and closed ends of their encasement passages, then to deflect 91 and 92 forward as 45 pulls these ribs sideways and downward as the tips of stays 16 and 32 reach their horizontal travel limit. Due to flexing ability of all stays and ribs, each will increase their prebent curvatures, as in FIGS. 21 and 23, as 45 is fully taut.

As in FIG. 30 the three-panel modification can be reduced to approx. 24-inches across by 12-inches in height for mounting upon a suitable bracket holding a small or medium format camera while the 6-inch support arm 36 will support any of the usual types of self-contained electronic flash units, when attached by either 39 or 40 upon tilting platform 38, as in FIG. 27. As with any of the versions of the invention reduced in size for "on camera" usage, the vertical swing movement of the light support arm, either 36 or the tubular 86, requires a restriction to 90° in its vertical adjustment, to thereby preclude encroachment of the arm or traveler into the camera lens' field of view. The affixing of this light source support arm and its limiting means 84 is applied to the front of the upper-support 74 with suitable rivets or screws, as in FIG. 27. The reduced size support structure for the entire apparatus can be attached atop a conventional type camera-bracket with one or two studs having knurled knobs which protrude through the bracket and engage similarly threaded holes in the base of 74, which need not measure more than $\frac{1}{2}"\times 2"\times 3"$ to place the light source 42 and reflector 45 well above the axis of the camera's lens, to thereby reduce shadows in the subject area and to eliminate "pink eye" effects when photographing human or animal subjects. As with other reduced versions of the invention, 42 is triggered directly from the camera's electrical sync-contacts through a connecting PC cable of existing types. The light pattern resulting from this three-panel modification is more angular than that of the four or six-panel versions and less broadened than that of the two-panel; however, the three-panel's pattern is more even in intensity overall. Each version producing an individual effect.

It should be noted that the average dimensions of the combined upper- and lower support for the larger versions of the invention are $1"\times 4"\times 6"$, and that there is a deliberate open space between the bottom of each panel and the tops of the stay and rib flanges, to eliminate excess rubbing of cover 45.

While the foregoing contains many specificties, these should not be construed as limitations of the scope of the invention or its construction, since numerous variations and changes to the elements of the prefered embodiment and its modifications shown and described herein may occur to others skilled in the art. Accordingly, the scope of the invention should not be determined solely by the examplifications illustrated, but by the appended claims and their legal eqivalents falling within the scope of the invention.

I now claim:

1. A collapsable light-reflector apparatus in an improved means for utilization of an idependent light-source of known flashing or constant beam types in producing indirect-lighting effects, as are principally used in photography wherein a unit of said light-source types is secured inversly to an area to be illuminated by the emitted beam being reflected by means of positioned reflective device to thereby indirectly illuminate said area, the improvement reflector apparatus comprises a fan-shape flexible cover having an inner-surface of reflective material and being supported and forward-contoured by a radial array of elongated pre-curved ribs and stays of semi-rigid material, said array being pivotally retained upon the upper-section of a two-sectional support structure, said upper-section structure comprises attaching, positioning and frictional stabilization means for directing the beam of one said light-source to impact said cover's inner-surface at an upward oblique angle to thereby cause the beam to deflect and diffuse into broadened patterns of richochetted rays reflected onto the area to be so illuminated by indirect-lighting effects, said lower-section support comprises means for axially tilting and stabilizing said upper-section as a means of directionally controling said richochetted rays, additionally said lower-section support structure comprises means for mounting and stabilizing said reflector apparatus upon conventional light-support types of equipment, as is in general use by photographers.

2. Apparatus as in claim 1 in which reflector apparatus comprises a fan-shape foldable cover of flexible material, said material being either fabric of the known types having simulated silver or gold or a mixture of threads thereof woven into their principally reflective side with white or colored threads inter-woven to form a less reflective reverse surface, such said fabrics being generally classed as "lame", or said cover may be comprised of plastic sheet material having metallic particles impregnated in its principally reflective surface with an opaque white or colored backing, such said plastics may be vinyl laminates having a two-ply bonding, either types of material comprise an optional means of altering the Kelvin degree temperature and/or color of light rays being reflected by the respective surfaces of said cover or of a substituted cover of said configuration.

3. Apparatus as in claim 2 wherein the said reflective cover is comprised of either of said material types being fabricated as multiple panels of said material, said panels being shaped as trapezoidal wedges or elongated triangles, whereby when joined the panels collectively form the fan-shape, four such panel of approximately 26-inches in height by 16-inches across at the top line provide an arc of 120° having about 5½ square feet of reflective area, said arc being variable by altering either size or number of said panels.

4. Apparatus as in claim 3 wherein said reflector cover means is comprised of multiple joined panels, said joining being done by mechanical stitching, cementing or heat-bonding as required for said flexible materials, prior to joining the slanting longitudinal adjacent edges of either of said shaped panels are overlapped upon the like surface of its adjacent panel by approximately 1-inch, said overlapping being done upon each front and rear like surface and thereafter joined, said overlapping and joining thereby comprise a series of radiating concealed passages within said fan-shape cover all ends of said passages being reinforced by reversing their respective edges and joining them to panel's reverse surface to form a mouth at the lower end while the upper end of each said passage is sealed by joining to thereby become a reinforced section of the fan-shape cover's periphery.

5. Apparatus as in claim 1 in which said reflector's cover is supported and forward-contoured by a means comprising a radial array of elongated pre-curved ribs and stays, said ribs and stays being about 30" long of material such as extruded non-ferous rods or cast of such plastics as polypropylene which will retain a curved configuration along the resilent properties, each rib and stay being a structure comprising blunted tips on their free ends with perpendicular flanges affixed to their opposite ends, said flanges being 1" and 2" in graduated and paired lengths with each flange affixed in such manner that it faces left or right to one vertical rib or stay in said array, said stays being of similar structure but less resilient as the means of spreading and/or folding said array and horizontally tauting said cover's panels.

6. Apparatus as in claim 5 in which said ribs and stays have a respectively left and right facing affixed flange at their lower ends, said flanges being paired in graduated lengths with the shortest flanges being affixed to the pair of ribs nearest the fan-shape's center panels, each of said flanges having a common-size hole near its free end as the means for securing all flanges by a pivotal retainer passing through said flanges to thereby maintain them in the said radial array, excepting a central rib which comprises an affixed means of securing it in a fixed vertical position.

7. Apparatus as in claim 6 in which said ribs and stays having said flanges with a common-size hole to accept a pivotal retainer means, said retainer being a bolt which passes through said paired flanges and which loosely secures them to the said upper-section support structure's rear surface, thereafter all said ribs and the left and right stay, which are outermost in the said radial array, are thereby limited to lateral mobility when spreading or folding said cover, excepting said central rib which is immobile by it being fixed to said upper-section's rear surface at a short space above the convergent axis of said array, which comprises said cover's support and which remains radial by its member ribs and stays insertion into the compatibly numbered radiating passages.

8. Apparatus as in claim 7 in which said radial array of ribs and stays are inserted into their respective passage's said reinforced mouth, to thereby support and forward-contours said cover, said insertion being done when said array is vertical with insertion being completed when all said blunted tips of ribs and stays contact the said closed end of their individual passage, but the lower edges of said panels are limited from contacting the said pivotal axis by the length of said panels and passages being shorter by about 4-inches than said ribs and stays, said exposed area of the array provides uncluttered space for a means of mechanically spreading and horizontally tauting said cover's panels, said means requires a second flange affixed to said left and right stay at a point directly beneath cover's bottom edge encasing said stays, said upper-flanges have a common-size hole near their free ends to allow connection of said spreader means to stays.

9. Apparatus as in claim 8 in which a mechanical means spreads and tauts said cover, the spreading apparatus is comprised of twin-levers which have common-size holes in each of their respective ends, two of said ends being pivotally connected by a frictionally adjustable bolt means while the opposite free ends are pivotally connected to the left and right flanges of the respective stays, said flanges being uppermost from the array axis, thereby enabling simultaneous outward movement of said levers which react against said connected flanges to thereby push said stays apart as the means of spreading said cover to its fan-shape, and thereby tauting said cover as downward manual pressure is applied to the said twin-lever's central pivot.

10. Apparatus as in claim 9 in which a mechanical spreading means comprising twin-levers opens and simultaneously tauts said cover, said levers additionally comprise a means of vertically tauting said cover and of retaining said cover upon said array when cover is collapsed for folding, said tauting and retaining means being comprised of opposite sections of Velcro-type fabric, wherein one-half of said fabric is woolly and of loose texture whereas its opposite half is composed of tightly grouped protruding loops which will engage and mesh with the woolly side to become a fastener, or mechanical dress-snaps having a male and female half which become a fastening means when engaged, one-half of either type fastener is affixed to said twin-levers at intervals corresponding to the center of each said panel along the cover's bottom edge, the opposite half of either type fastener being affixed to said panel edges, when engaged said fasteners pull downward upon their respective panels to thereby vertically streach said panels against the resistance of the blunted tips of each said rib and stay, said pulling action by said twin-levers additionally is the means of increasing the forward-curved deflection of said ribs and stays to thereby increase said cover's concaved configuration when spread and tauted, said releasible fastening means allows simple reversal or substitution of said cover.

11. Apparatus as in claim 10 said cover and its supporting array is radially maintained upon the rear-surface of said upper-section support structure, said upper-section additionally comprises an apparatus means for attaching, supporting and frictionally stabilizing a unit of said light-source types, said means being secured to the front-surface of said upper-section comprises a rectangular lever approximately ½" by 1" and 12-inches long protruding from two upright extensions of said upper-section support structure forming a yoke at the top of said structure, said yoke having holes passing through its top ends for axially connecting said lever having a similar size hole in one of its ends, said two-sectional support structure being of a rigid but malleable metallic alloy or a composition such as polyvinylchloride, which will retain threading of 12/20 size yet allow an inward deflection of a degree necessary to frictionally stabilize said lever by the tightening of a bolt-axle, thereby said light-source support lever has vertical articulation of approximately 100° in front of said reflector cover.

12. Apparatus as in claim 11, said light-support lever supports additional means for positioning a unit of said light-source types in directing its emitted beam prior to its impacting said cover's inner-surface, said positioning means comprise a traveler structure of said rigid material sliding upon said lever with said traveler having a set-screw means for frictional stabilization at any point along said lever until said traveler is limited by an upward protrusion at said lever's end, said traveler having two uprights forming a compressable yoke which mates to an axially connected downward extension of a tiltable platform, said pivotal means being a ¼" diameter 12/20 bolt passing through common-size holes in said yoke and platform extension's ends, a wing-nut tightened on said bolt secures said platform's desired angle;

13. Apparatus as in claim 11 in which said light-source support means comprises three member structures of said rigid materials, each of said member remains attached to upper-section support structure for quick attachment of said light-source and its adjustable positioning principally being ahead of and below said axis of reflector to direct said beam obliquely upward when it impacts said forward-curved inner-surface, to thereby be deflected and reflected as richochetted rays onto the area to be illuminated.

14. Apparatus as in claim 12 in which said light-source support and positioning means comprises a tiltable platform pivotally affixed atop said sliding travler, said platform being approximately 3-inches long by 1" wide of said rigid material is principal support for two means of said light-source types attachment upon said platform's upper surface, the first attaching means being a "shoe bracket" affixed at the front end of said platform which will engage and stabilize the "foot" fixture below the housing of standard known self-contained flashguns and electronic flash units intended for "hot shoe" mounting on-camera usage, the second said attaching means atop said platform is located near its rear edge and comprises a ¼-inch 12/20 threaded stud which passes upward through said platform from underneath and extends approximately ½-inch above said platform's upper surface to thereby enter a similarily threaded female receptacle when attaching strobe lights having such mounting requirements, especially strobes with lampheads having separate power-packs, said attachment being completed by tightening said threaded stud by rotation of its over-size head, thereafter either of said types of strobes or quartz halogen and similar incandescent bulb type lampheads are attached in a manner facing said reflector's concaved inner-surface, additionally said platform's attaching means will likewise secure electronic "trigger" devices since the majority of such devices use the industry standard "hot shoe" foot and-/or female threaded receptacle system of mounting, said triggering devices being normally necessary to remotely fire "slave" lights on such reflectors.

15. Apparatus as in claim 14 in which one of said various types of light-sources is attached and supported upon said reflector apparatus by said intergrated adjustable means comprise an additional method usage of said reflector, whereby more conventional "bounce" lighting effects are created by elevating said light-source support lever from its usual position of approximately 45° below the reflector's array axis to 45° above axis, thereafter said tiltable platform with its attached light-source is aligned and stabilized to direct an emitted beam nearly perpendicularly for its impact upon said inner-surface of reflector's cover, thereby reflected rays are more widely dispersed with less intensity than from said rays being rechochetted with greater directional effects, due to ray's travel falloff.

16. Apparatus as in claim 1 in which said reflector and light-source is supported upon a two-sectional structure's upper-section, said section being axially connected to a lower-section of said rigid material comprising a mounting yoke consisting of two upright extensions of its rectangular shape's upper-edge, said yoke having holes through its extended ends which align with a similar sized but female-threaded 12/20 hole passing through a mating downward extension of said upper-section's lower-edge, twin thumbscrews entering said threaded section through said holes in yoke's uprights provide both pivotal movement for upper-section support structure and means for stabilizing said upper-section at a desired angle as the reflector's means of directing its reflected illumination, said movement being vertical within an arc of about 300°, additionally said lower-section's bottom-edge comprises means for mounting entire said reflector apparatus upon known types of lighting equipment stands and/or hangers as are conventionally used by photographic studios, said lower-section having a ½" diameter hole in its bottom-edge to receive the mounting tip of said support equipment, whereupon said reflector apparatus may be horizontally rotated 360° for positioning its reflective output, said positioning being established, the entire apparatus is secured to said support equipment by tightening a thumbscrew of 12/20 threading into a like threaded hole which penetrates said mounting hole from a side edge of said lower-section, whereupon said thumbscrew is tightened against said engaged tip to secure said apparatus.

17. Apparatus as in claim 1 but modified to have a cover of like material and fabrication but comprising two reflective panels of triangular shape, said panels being overlapped along two of their similar slanting adjacent lines and thereafter joined to form a central passage for a rib's insertion, said rib being of said material and pre-curved configuration is vertically affixed to rear surface of said upper-section support structure, whereas similarly constructed stays are pivotally secured to said rear surface by respectively left and right thumbscrew frictional stabilizing means, when said cover is spread by separate lateral movement of said stays away from said central rib, said modification being adaptable for direct mounting onto a suitable bracket means which supports and secures still-cameras of the medium or small format types, wherein said modification is a reduced size inverted fan-shape of approximately 24-inches across and 12-inches high, thereby having a reflective area of about two square feet.

18. Apparatus as in claim 1 modified to have a similar fan-shape cover but which is comprised of three equilateral triangular panels, one said panel being inverted to have its apex adjoining the bases of the left and right respective adjacent panels, said panels being overlapped upon each's front and rear surface material and joined to form two divergent angled passages for said rib insertions, as with all said cover's variations the two stays are encased within tubes formed by overlapping the outside panels' outer edges onto said panels opposite surface, but in this modification the base edges of said triangular panels are so fabricated by joining, only two of said configured ribs being used with each having a respective left or right facing perpendicular flange which are paired opposed to said similar flanges on the stays, thereafter each pair of rib and stay are separately pivotally secured by thumbscrew frictional means threaded into 12/20 size holes in said upper-section support, whereby each said pair is spread and stabilized by separate lateral movement with said movement of each rib being limited by its encasement in said cover and by a protruding "stop" affixed between each said pair, thereby tauting said cover as said stays pull each rib against its respective stop, said comprised fan-shape cover and support apparatus being adaptable for mounting onto a suitable bracket which secures still-cameras of medium or small format types, when said modification is reduced to an approximate spread of 24 by 12 inches having about 2½ square foot area.

19. Apparatus as in claim 12 in which three said member structures comprise an apparatus means for attaching, supporting, positioning and stabilizing one unit of said light-source types, said apparatus being modified to comprise a tubular support lever of approximately ½-inch diameter by 12-inches in length, said length being variable to coincide with enlargement or reduction in said cover's overall size, said lever having a hole near one end with the sides of said lever being flattened to the extent that they will fit snuggly into a compressable yoke formed by twin upright extensions of said upper-section support structure, said yoke having aligned holes near the tops of said extensions to accomodate a ¼-inch axle having 12/20 threads at its ends for twin wing-nut compression means to thereby adjust and stabilize said lever at various vertical angles, said tubular lever having a flared area at its opposite end to serve as a stop means for a sliding traveler, said traveler being of rigid metallic alloy or plastic composition having an oversize ½-inch hole passing through its approximately 1-inch square mid-section at allow its free forward or backward movement upon said lever, said traveler having threaded ¼-inch hole transverse to said ½-inch hole to penetrate said hole from each side of traveler, thereby short 12/20 thumbscrews are tightened to engage said lever to secure said traveler at a selected position on the lever, said traveler being approximately 3-inches long has a section equal to one-half its width removed to form an extension of one side surface, which is principally parallel to said lever, with a similar extension on said traveler's opposite end and with each end having 12/20 threaded holes at the end of their flat 1"×½" surfaces, a 1-inch cube of similar material and having an undercut removal of one-half its sectional area mates with one of said traveler's extension and has an aligned unthreaded hole for passage of an axially connecting thumbscrew as its frictional securing means, top said adjustable platform is affixed a shoe-bracket for attaching a light-source unit requiring such mounting, whereas on the opposite end of said traveler a similarly connected platform having an extended section of its top rear surface comprises a means for attaching and securing said lampheads having a 12/20 industry standard (USA) mounting receptacle in the housing, said threaded receptacle being engaged by a short 12/20 stud passing through the said rearward extension's underside to thereby mate the light-source housing, each type of attachment means rotated principally uppermost upon said traveler and lever is thereafter adjusted and frictionally stabilized at the desired angle relative to said reflector's cover, whereas the attaching means on said traveler's opposite end allows mounting of usual electronic triggering devices for remote firing of said "slave light" when required for such indirect-lighting.

20. Apparatus as in claim 5 in which elongated pre-curved ribs having blunted ends and affixed perpendicular flanges as the means comprising the said cover's prefered and/or modified configuration's support, spreading and forward-contouring, said stays having similar construction and affixed fittings, said construction being modified whereby a single rod-like element such as 1/8" by 36-inch long brass brazing rod is formed by cold bending to thereby form a unitized rib having an "eye" bend for said blunted tip and having its shaft bent forward and parallel to said "eye" for a distance of approximately 30-inches, at which point a circular ¼-inch bend is formed around a mandril, thereafter the remaining length of the free end is soldered or otherwise affixed alongside said shaft to serve as a strengthening means, whereas said stays are similarly formed of ¼"or 3/8" rodstock for their greater strength as the means for spreading and tauting said cover types, additionally said stays have a second circular bending about 6-inches above their pivotal end and any angled bend required for its offsetting, as with said perpendicular flanges, said secondary circular bend thereby provides for pivotally securing aid spreader's twin-lever means for spreading and folding any of said cover types, excepting those modified for camera-bracket mounting which are of such reduced size as to not require a spreading and tauting means.

* * * * *

UNITED STATES PATENT AND TRADEMARK OFFICE
CERTIFICATE OF CORRECTION

PATENT NO. : 4,524,405

DATED : June 18, 1985

INVENTOR(S) : Charles M. Heard

It is certified that error appears in the above-identified patent and that said Letters Patent is hereby corrected as shown below:

The title page showing the illustrative figure should be deleted to appear as per attached title page.

Signed and Sealed this

Eighteenth Day of April, 1989

*Attest:*

DONALD J. QUIGG

*Attesting Officer*  *Commissioner of Patents and Trademarks*

United States Patent [19]

Heard

[11] Patent Number: 4,524,405
[45] Date of Patent: Jun. 18, 1985

[54] FAN-SHAPED INDIRECT LIGHTING REFLECTOR

[76] Inventor: Charles M. Heard, 107 Aribe Dr., San Antonio, Tex. 78216

[21] Appl. No.: 530,369

[22] Filed: Sep. 8, 1983

[51] Int. Cl.³ .................................. G03B 15/02
[52] U.S. Cl. .................................. 362/18; 362/278; 362/297; 362/320; 362/346; 362/347; 362/449; 362/450
[58] Field of Search ............... 362/18, 278, 297, 320, 362/346, 347, 449, 450

[56] References Cited

U.S. PATENT DOCUMENTS

| | | |
|---|---|---|
| 3,851,164 | 11/1974 | Intrator ............................ 362/320 |
| 4,075,472 | 2/1978 | Higuchi ............................ 362/320 |

Primary Examiner—Stephen J. Lechert, Jr.

[57] ABSTRACT

A fan-shape foldable reflector apparatus for use with known flashing or constant beam light-source types, such are generally used by photographers for producing indirect-lighting effects by directing the emitting beam from such a light-source type to impact a reflective surface which faces an area to be so illuminated. The said fan-shape reflector produces similar indirect-lighting effects by causing the beam emitted from such a light-source type to impact this forward-curved reflective means at an upward oblique angle, thereby the beam is refracted, broadened and richochetted as diffused rays onto a subject area to which said reflector is principally faced. This improved reflector additionally comprises all necessary means for attaching and positioning various type light-sources.

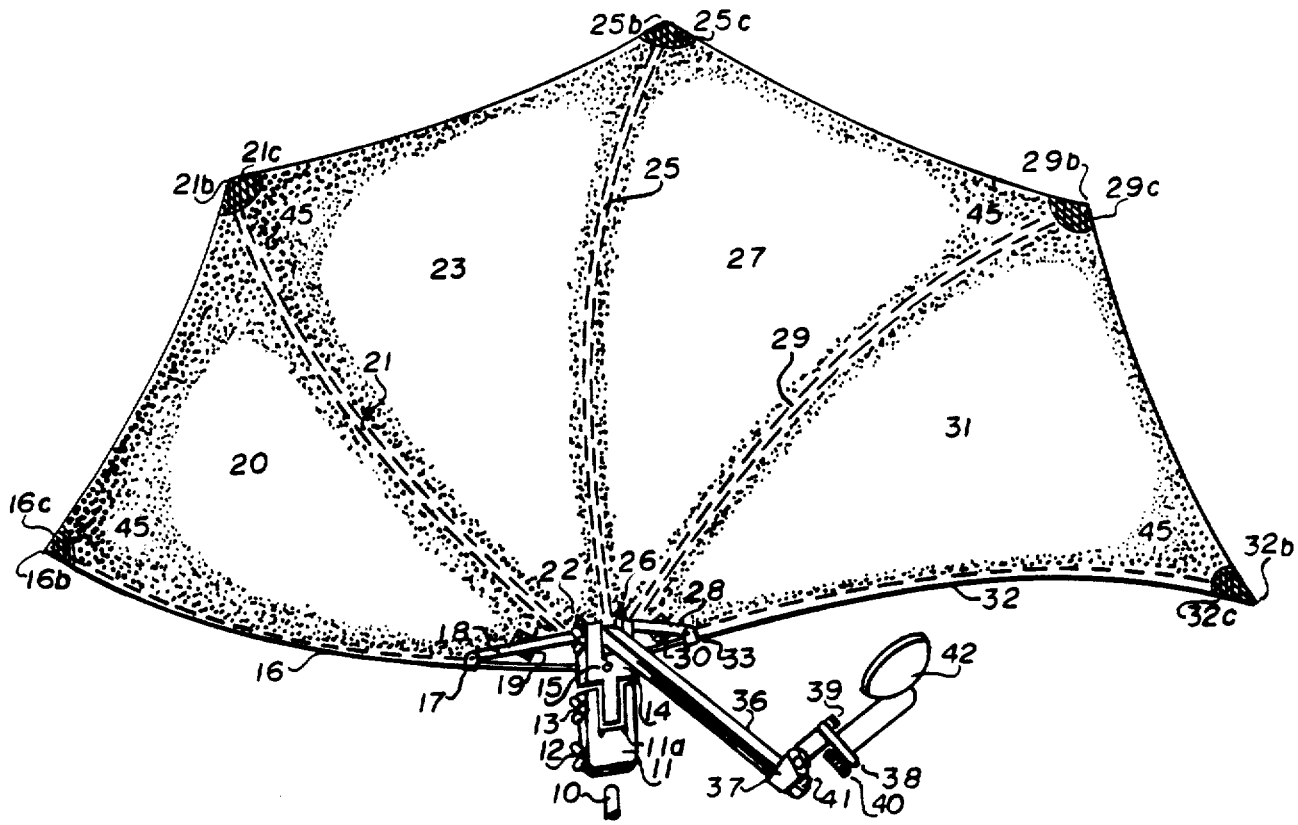

20 Claims, 30 Drawing Figures